United States Patent [19]

Wu et al.

[11] Patent Number: 5,931,912
[45] Date of Patent: Aug. 3, 1999

[54] TRAVERSAL PATH-BASED APPROACH TO UNDERSTANDING USER-ORIENTED HYPERTEXT OBJECT USAGE

[75] Inventors: Kun-Lung Wu, Yorktown Heights; Philip Shi-Lung Yu, Chappaqua, both of N.Y.

[73] Assignee: International Business Machines Corporation, Armonk, N.Y.

[21] Appl. No.: 08/708,004

[22] Filed: Aug. 9, 1996

[51] Int. Cl.$^6$ .................................................. G06F 17/00
[52] U.S. Cl. .......................................................... 709/224
[58] Field of Search ........................ 395/200.54, 200.33, 395/200.59, 187.01, 200.48; 364/284.4, 200.57, 242.94, 280; 709/224

[56] References Cited

U.S. PATENT DOCUMENTS 5,355,487 10/1994 Keller et al. ............................ 395/650

OTHER PUBLICATIONS

Computer Networks, Tanenbaum, Prentice–Hall, 1981, p. xiv, 36 and 86, 1981.
Dictiornary of Computing, Oxford University Press, 1996.
Build a World WIde Web Commerce Center, net.Genesis, Wiley & Sons, 1996.
Apache Server Log "Multiple Log Files" Man Page, Apache Group, 1996.
The Computer Science and Engineering Handbook, CRC Press, pp. 211–213 (describing Prim (1957), 1997.
World Wide Web & HTML—preparing documents for online presentation, MacArthur, Douglas, Dr. Dobbs Journal, pp. 18–26, Dec. 1994.
Getstats Documentation, (www.eit.com/software/getstats.getstats.html), p. 5.
Silk from a sow's ear: extracting usable structures from the web, Pirolli, Peter et al., Proceedings of the 1996 Conference on Human Factors in Computing Systems, CHI 96, ACM pp. 118–125, 1996.
SpeedTracer: a Web usage mining and analysis tool, Wu, K.–L. et al., IBM Systems Journal, pp. 89–105, 1998.

*Primary Examiner*—Ellis B. Ramirez
*Attorney, Agent, or Firm*—F. Chau & Associates, LLP

[57] ABSTRACT

A method and system to map client access patterns in a stateless hypertext server. For each hypertext object access, a plurality of information about the access may be collected, including the requestor address, the hyperlink source, and the hyperlink target. When available, a time stamp of the access and agent information may also be used. The hyperlink source and hyperlink target form a hyperlink access pair, representing a step in the user traversal path on the hypertext objects. These hyperlink access pairs are then mapped into hyperlink access groups. Each hyperlink group represents all the hypertext objects visited by a user along a traversal path. To map hyperlink access pairs into access groups, each access pair is added to an active session if the new access pair can expand the session into a connected traversal path. Once hyperlink groups are identified, user-oriented object usage statistics can be analyzed. When client and/or proxy caching occurs, hypertext objects are fetched locally instead of from the hypertext server. Thus, no requests are made to the server for the cached objects. As a result, it may be required to add valid backward traversal steps to an active session in order to form a valid connected traversal path. One could find any backward traversal path for the needed backward steps. To preserve memory space, a method is also disclosed which finds the shortest valid backward traversal path. Once the client access patterns have been mapped, a user-oriented statistical analysis can be performed.

41 Claims, 12 Drawing Sheets

TRAVERSAL PATH-BASED APPROACH TO UNDERSTANDING USER-ORIENTED HYPERTEXT OBJECT USAGE

RELATED APPLICATIONS

The present invention is related to co-pending U.S. patent application Ser. No. 08/525,891, entitled "A Fast Method for Mining Path Traversal Patterns", by Ming-Scan Chen and Philip S. Yu, filed Sep. 8, 1995, IBM Docket No. YO995-119, which is commonly assigned to the assignee of the present invention, and is hereby incorporated by reference in its entirety.

FIELD OF THE INVENTION

The present invention generally relates to computerized methods of understanding client access patterns in stateliness server environment. A more particular aspect of the present invention is related to the analysis of user behavior in accessing hypertext objects in a stateliness hypertext server, such as a World Wide Web hypertext server in the Internet providing hypertext objects to various clients equipped with a browser.

GLOSSARY OF TERMS

Internet: The network of networks and gateways that use the TAP/TIP suite of protocols.

Client: A client is a computer which issues commands to the server which performs the task associated with the command.

Server: Any computer that performs a task at the command of another computer is a server. A Web server typically supports one or more clients.

Network protocols: standard methods for machines to communicate with one another. The protocols indicate how data should be formatted for receipt and transmission across networks. Heterogeneous machines can communicate seamlessly over a network via standard protocols. Examples of standard Internet protocols include: HTTP, see, e.g., "Hypertext Transfer Protocol—HTTP/1.0", http://www.ics.uci.edu/pub/ietf/http/draft-ietf-http-v10-spec-03.html, by T. Berners-Lee, R. Fielding, and H. Frystyk, Sep. 4, 1995; SMTP, see, e.g, "Simple Mail Transfer Protocol". RFC 821, J. B. Postel, Information Sciences Institute, USC, August 1982, http://ds.internic.net/std/std10.txt.; and, FTP, see e.g., J. Postel and J. K. Reynolds. "File Transfer Protocol (FTP)", RFC 959, Information Sciences Institute, USC, October 1985, http://ds.internic.net/std/std9.txt.

Client-server model: one of the dominant paradigms in network programming, see, e.g., W. R. Stevens, "Unix Network Programming", Prentice Hall PTR, Englewood Cliffs, N.J., 1990; and D. E. Comer, "Internetworking with TCP/IP" vol 1., Prentice Hall, Englewood Cliffs, N.J., 1991. A server program offers a service which can be accessed by multiple users over the network. A program becomes a client when it sends a message to a server and waits for a response from the server. The client process, which is typically optimized for user interaction, uses the requested service without having to know any of the detailed workings of the requested service or server.

World Wide Web (WWW or Web): The Internet's application that lets people seeking information on the Internet switch from server to server and database to database by clicking on highlighted words or phrases of interest (hyperlinks). An Internet WWW server supports clients and provides information. The Web can be considered as the Internet with all of the resources addressed as URLs and which uses HTML to display the information corresponding to URLs and provide a point-and-click interface to other URLs. On the World Wide Web, "browsers" constitute client programs while the programs sending back information to the browser constitute server programs.

Universal Resource Locator (URL): A way to uniquely identify or address information on the Internet. Can be considered to be a Web document version of an e-mail address. URLs can be accessed with a Hyperlink. An example of a URL is "http://www.arun.com:80/table.html". A URL has four components. Starting from the left, the first specifies the protocol to use, separated from the rest of the locator by a ":". Next is the hostname or IP address of the target host; this is delimited by the "//" on the left and on the right by a "/" or optionally a ":". The port number is optional, and is delimited on the left from the hostname by a ":" and on the right by a "/". The fourth component is the actual file name or program name. In this example, the ".html" extension means that this is an HTML file.

HyperText Markup Language (HTML): HTML is the language used by Web servers to create and connect documents that are viewed by Web clients. HTML uses Hypertext documents. Other uses of Hypertext documents are described in U.S. Pat. Nos. 5,204,947, granted Apr. 20, 1993 to Bernstein et al.: 5,297,249, granted Mar. 22, 1994 to Bernstein et al.; 5,355,472, granted Oct. 11, 1994 to Lewis; all of which are assigned to International Business Machines Corporation, and which are incorporated by reference herein.

Hypertext transfer protocol (HTTP): HTTP is an example of a stateliness protocol, which means that every request from a client to a server is treated independently. The server has no record of previous connections. At the beginning of a URL, "http:" indicates the file contains hyperlinks.

Internet Browser or Web browser: A graphical interface tool that runs Internet protocols such as http, and display results on the customers screen. The browser can act as an Internet tour guide, complete with pictorial desktops, directories and search tools used when a user "surfs" the Internet. In this application the Web browser is a client service which communicates with the World Wide Web.

HTTP daemon (HTTPd): An IBM OS/2 Web Server or any other server having Hypertext Markup Language and Common Gateway Interface capability. The HTTPd is typically supported by an access agent which provides the hardware connections to machines on the intranet and access to the Internet, such as TCP/IP couplings.

BACKGROUND

In a stateliness hypertext server environment, such as a World Wide Web server in the Internet, hypertext objects are transferred between the server and clients via the network and Hypertext Transfer Protocol (HTTP). A client makes a request to a server for hypertext objects, usually through a browser which is a software tool running on the client's system; the server retrieves the requested objects and sends them through the network to the client. These hypertext objects are then displayed on the client's browser. HTTP is an example of a stateliness protocol. This means that every request from a client to a server is treated independently. After the server responds to the client's request, the connection between the client and the server is dropped. There is no record of prior activities from a given client address.

The server treats every request as if it were brand-new, i.e., without context. Two advantages of using stateliness protocols are efficiency and simplicity.

Due to security concerns, a firewall, also called a proxy server, is typically employed between clients and the network which connects to a hypertext server where requested objects are stored. Client users access the hypertext objects of the hypertext server in the network through the proxy server. In so doing, the real client address is replaced with the proxy server's address before the requests for objects are sent to the hypertext server. Here, the real client identities are generally not available to the hypertext server.

With client identities usually masked by the proxy server, a client usually accesses the hypertext objects of a server in an anonymous way. However, such anonymity inhibits the analysis of aggregate user behavior, since the hypertext server cannot distinguish requests from different clients who access hypertext objects via the same proxy server. The hypertext server also cannot determine which group of objects are accessed together in a user session by an individual client. Hence, it becomes difficult to collect user-oriented hypertext object statistics. Understanding user-oriented object usage would provide many benefits, such as more effective marketing and better presentation of hypertext objects.

Current object usage statistics is typically limited to raw access counts. Simple raw access counts may substantially overstate the actual number of client accesses to a hypertext object, as the same user may repeatedly access to the same object by going back and forth through a hyperlink. The counting of repeated accesses by a single user to an object can lead to inaccurate conclusions in some cases.

A simple approach to grouping user accesses into user sessions is based on time stamps. For example, a user session could include all accesses within a predetermined interval. Unfortunately, this approach cannot distinguish two different client requests coming from the same proxy server within the specified time interval. Also, a single user session exceeding the predetermined interval will incorrectly be counted as two sessions.

Thus, there is a need for an improved method and system for analyzing user-oriented hypertext object usage. The present invention addresses such a need.

In order to improve performance, client and/or proxy caching are usually employed. With caching, hypertext objects are fetched locally instead of from the hypertext server. Thus, no requests are made to the server for the cached objects. There is also a need for a method and system for analyzing user-oriented hypertext object usage which accounts for client and/or proxy caching. The present invention addresses such a need.

SUMMARY

In accordance with the aforementioned needs, the present invention is directed to a method and system to identify user sessions in a stateliness hypertext server so that user-oriented object usage statistics can be analyzed. According to a first aspect of the present invention, for each hypertext object access, a plurality of information about the access is recorded, including the requestor address, the hyperlink source (i.e., the hyper-text object that refers the client to the target object), the hyperlink target (i.e., the hypertext object being accessed) and the time stamp of the access. The hyperlink source and hyperlink target are used to form a hyperlink access pair, representing a step in the user traversal path on the hypertext objects. These hyperlink access pairs are then mapped into hyperlink access groups. Each hyperlink group represents all the hypertext objects visited by a user along a traversal path. To map hyperlink access pairs into access groups, each access pair is added to an active session if the new access pair can expand the session into a connected traversal path. Once hyperlink groups are identified, user-oriented object usage statistics can be analyzed.

In order to improve performance, client and/or proxy caching are usually employed. With caching, hypertext objects are fetched locally instead of from the hypertext server. Thus, no requests are made to the server for the cached objects. As a result, it may be required to add certain backward traversal steps to an active session in order to form a connected traversal path. Since the server would not have any knowledge about a client's access to the cached objects, it is sufficient to find any backward traversal path for the needed backward steps. According to another aspect of the present invention, a method is disclosed to find the shortest backward traversal path in order to save memory space during the session identification.

BRIEF DESCRIPTION OF THE DRAWINGS

These and other features and advantages of the present invention will become apparent from the following detailed description taken in conjunction with the accompanying drawings, wherein.

DETAILED DESCRIPTION

Figure 1:
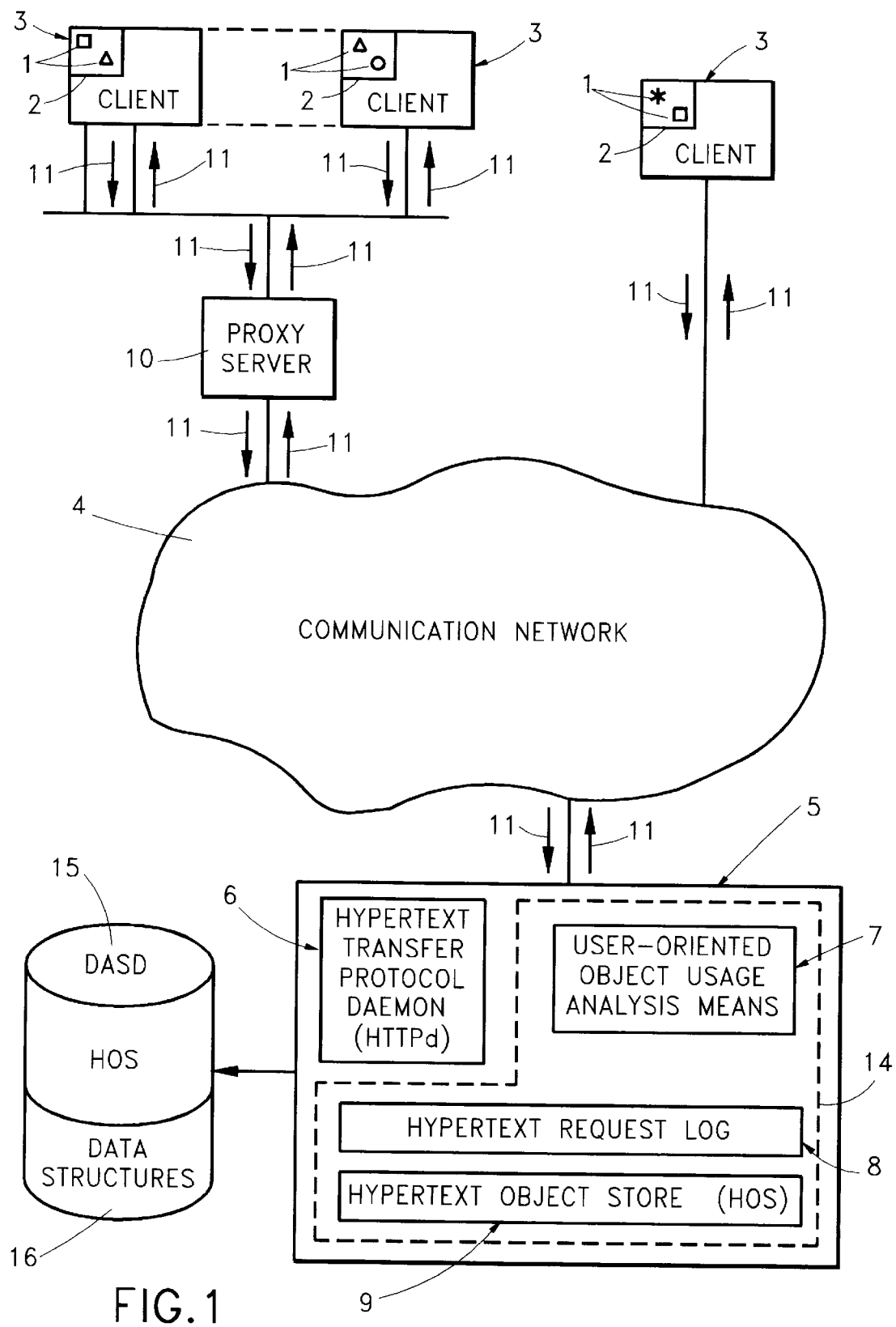
FIG. 1 is a block diagram of a hypertext server system having features of the present invention.

FIG. 1 is a block diagram of a stateliness hypertext server system 5 that provides services to a plurality of clients 3 through a data communication network 4. An example of such a system is a World Wide Web server using the Hypertext Transfer Protocol 11 (HTTP) to provide hypertext objects to various clients through the Internet. A client system 3 typically uses a software browser 2 to retrieve and display hypertext objects 1 through the communication network 4. Often, client systems 3 are hidden behind a proxy server 10, also called a firewall, between them and the data communication network 4. A proxy server is a firewall which can protect client identities from the network. A client can also be directly connected to the data communication network without a proxy server. In any case, the communications between the client and the server are typically statelessness, i.e., after the requested hypertext objects are sent to the client from the server, the connection is dropped. The server treats each hypertext request as a brand new request without prior context.

Figure 4:
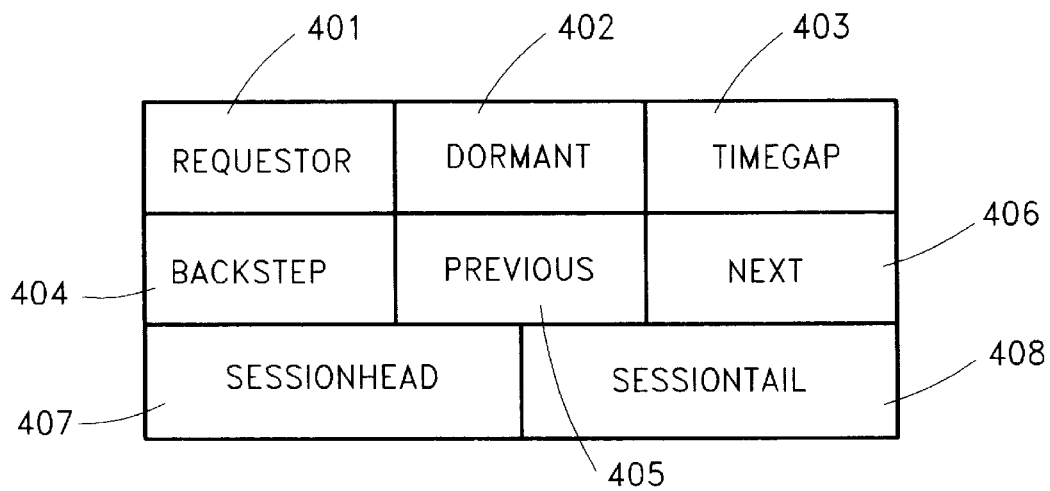
FIG. 4 is an example of a data structure header of an active user session according to the present invention.
Figure 5:
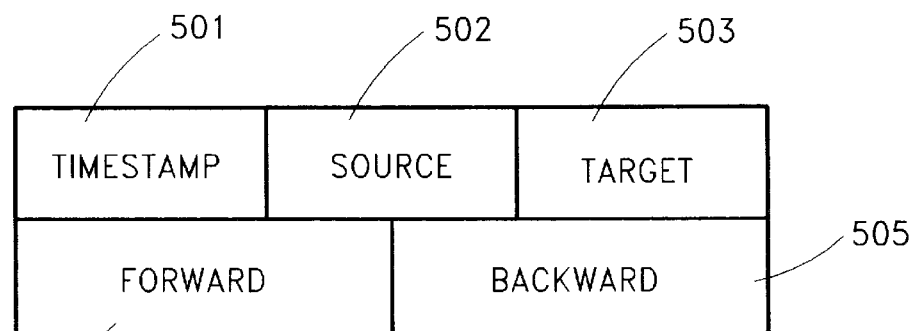
FIG. 5 is an example of a data structure for a hyperlink access pair according to the present invention.

A hypertext server system has a hypertext object store 9 from which hypertext objects are retrieved and sent to clients through a data communication network 4. The hypertext object store 9 can be a file system or a database system. The hypertext objects are typically stored in a stable memory such a Direct Access Storage Device (DASD) 15 which can be retrieved into main memory 14 when requested. The hypertext server uses a conventional HTTPd 6 to process requests from clients. An example of a HTTPd is the Internet Connection Server, sold by IBM. For each hypertext request that is processed, the server system typically logs certain information about the request in a hypertext request log 8 in main memory 14. When the main memory 8 allocated for the logs becomes full, the logs are typically spooled to a stable large capacity storage device such as DASD 15. The information in the hypertext object request log 8 may be used to perform user-oriented object usage statistics. According to a preferred embodiment of the present invention, a user-oriented object usage analysis logic 7 uses the hypertext object request log 8 to construct data structures, 16 (such as are depicted in FIGS. 4–5) representing user traversal paths, which may be stored in memory 8 and/or DASD 15. The object usage analysis logic 7, is preferably embodied as computer readable program code stored on a computer readable medium such as DASD 15, or other conventional magnetic media such as a disk or optical media such as a CD-ROM. The object usage analysis logic 7 is preferably loaded into main memory 8 and executed on the server 5 to process the hypertext request logs 8 in a batch mode. The object usage analysis logic 7 will be described with reference to FIGS. 3 through 13. Those skilled in the art will appreciate that the statistical analysis can be conducted by the hypertext server itself 5 or can be executed against the logs on or through a different system. Those skilled in the art will also appreciate that the object usage analysis logic 7 can also be executed dynamically as clients 3 access the hypertext server 5.

Figure 2:
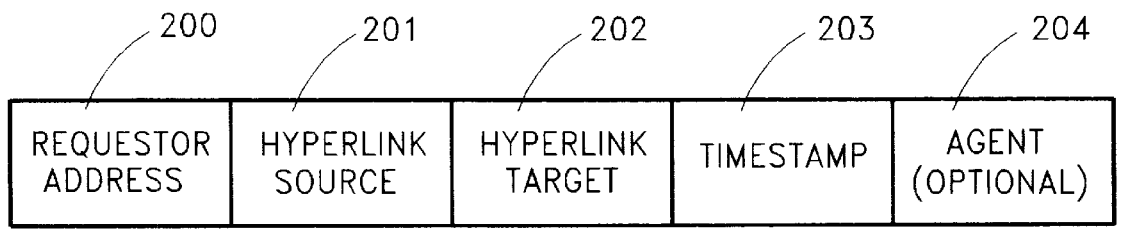
FIG. 2 depicts a data structure constructed from information logged by a stateliness hypertext server in response to a client request.

FIG. 2 depicts a data structure constructed from information logged by a stateless hypertext server in response to a client request. The information may include a requestor address 200, hyperlink source 201, hyperlink target 202, time stamp 203 of the access, and (optional) agent information 204. The requestor address 200 is the network address (such as the IP address) of the source of the hypertext object request. This requestor address may be the client's TIP address or it can be the proxy server's IP address if the client accesses the hypertext server through a proxy server. The time stamp 203 is the time when the requested hypertext object is processed and sent from the server. Hypertext objects, such as HTML files and CGI programs, are usually accessed by a client through a hyperlink embedded in another hypertext object, such as an HTML file displayed on a browser 2, which is HTML compatible. Thus, the requested object is called the hyperlink target 202 and the object that refers the client to the target object is called the hyperlink source 201. Both hyperlink source 201 and hyperlink target 202 are typically represented by a universal resource identifier (URI) or universal resource locator (URL) in HTTP.

Logging is a typical function performed by a hypertext server for each access to a hypertext object. Those skilled in the art will appreciate that there may be more or different information than that indicated in FIG. 2; and that the logs can be stored in a single log file or multiple log files. The following is a sample log entry from the NCSA HTTPd:

good.watson.ibm.com - - [Mar. 14, 1996:11:25:11-0500] "GET /www/mozock.htm HTTP/1.0" 200 913 "http://bad.watson.ibm.com/book.htm" "Mozilla/2.0 (XII; I; AIX 2)".

This log entry indicates that a request from good.watson.ibm.com (requestor address 200) to access /www/mozock.htm (hyperlink target 202) was performed successfully on Mar. 14, 1996 at 11:25:11. A total of 913 bytes of data were transferred to the client, which is using a browser of Mozilla/2.0 running under AIX 2 (agent info 204). The hyperlink target 202 was referenced from http://bad.watson.ibm.com/book.htm (hyperlink source 201).

The hyperlink source 201 and hyperlink target 202 together form a hyperlink access pair (to be discussed later with reference to FIG. 5). The hyperlink access pair represents a traversal step by the client 3 from the source object 201 to the target object 202. According to one aspect of the present invention, traversal steps may be grouped (also called partitioning or mapping) together to construct hypertext access groups, representing a traversal path during a user access session. The user access session identification process is also called session identification. Information which may be used for session identification includes the requestor address 200, the hyperlink source 201, the hyperlink target 202 and the time stamp 203. The agent information 204, indicating information about the software browser running on the client system, can also be used in the session identification process. For example, two access pairs may have the same requestor address because they come from the same proxy server but have different agents. The agent information can be used to map the otherwise indistinguishable access pairs into two different sessions. Those skilled in the art will appreciate that the various information about a request can be obtained from a single or multiple log files.

Figure 3A:
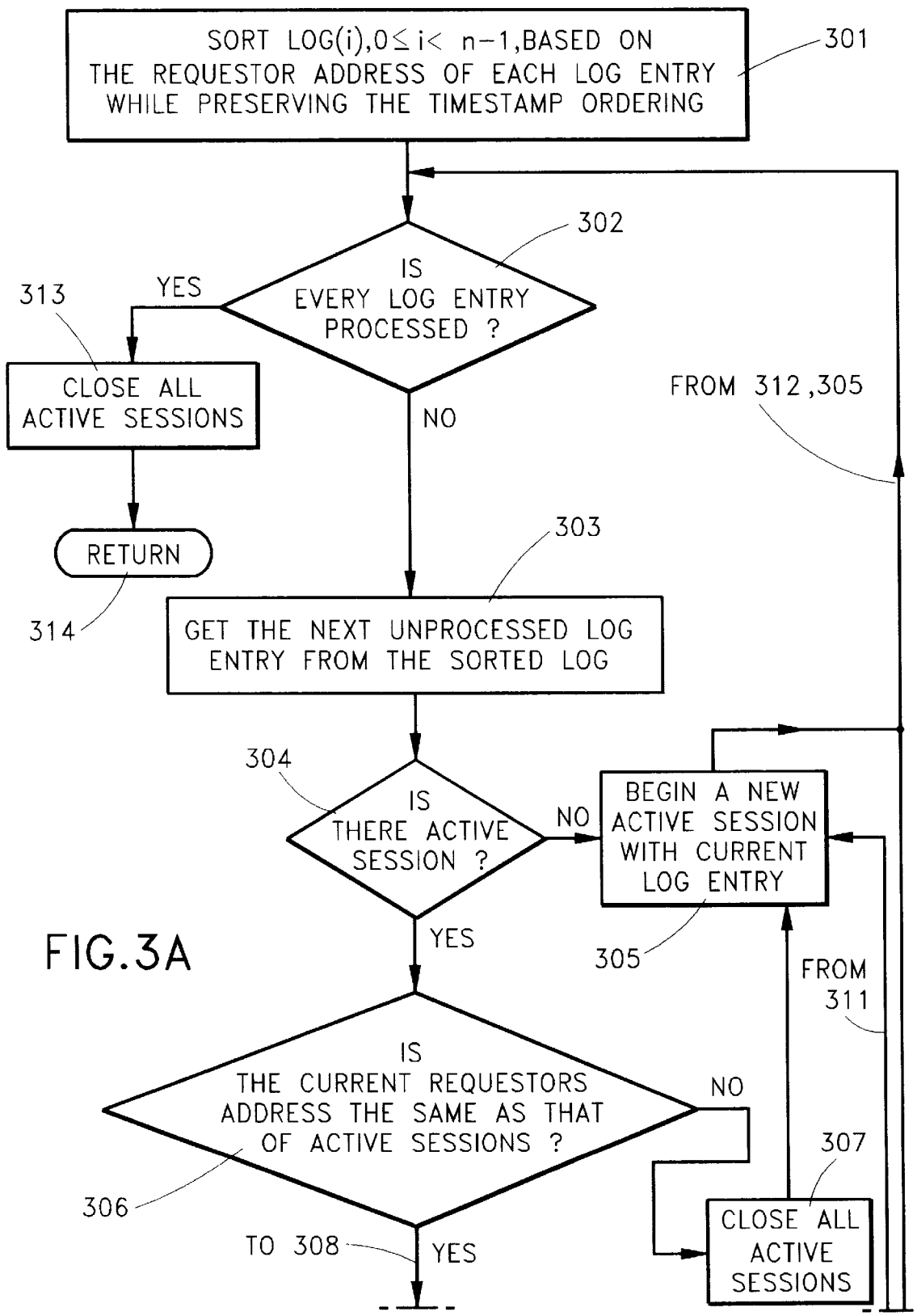
FIG. 3 is an example of the user-oriented object usage analysis logic of FIG. 1.
Figure 3B:
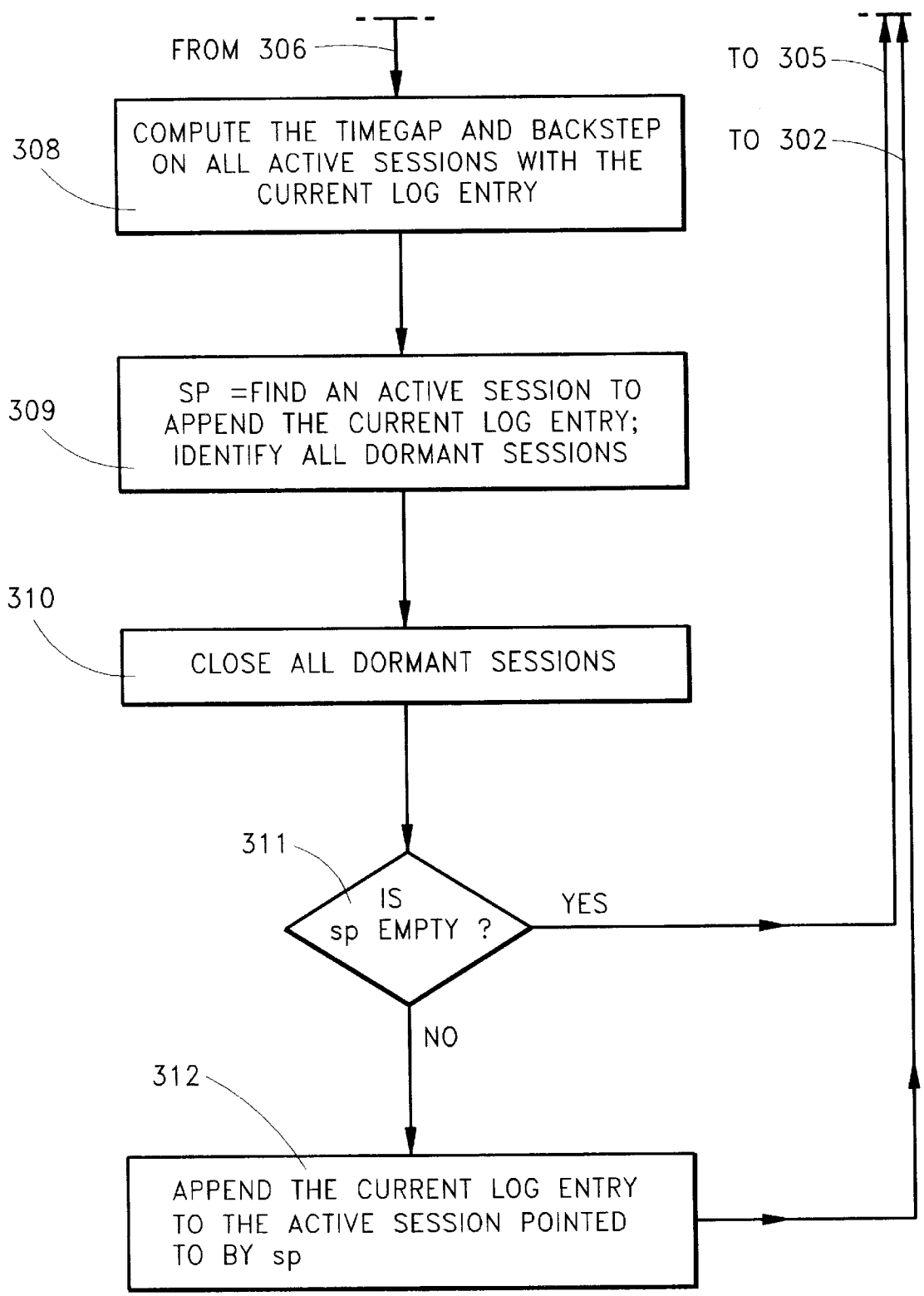

FIG. 3 shows an example of the user-oriented object usage analysis logic 7 of FIG. 1. A traversal path-based approach to session identification by partitioning the hyperlink access pairs into access groups is depicted. By way of overview, the session identification process opens a plurality of active sessions and maps each access pair, represented by a log entry, to the tail end of one of the sessions. Assume that a log of n entries corresponding to n hypertext object accesses to the server 5 are to be processed. Each log entry contains a plurality of information about each access, such as is shown in FIG. 2. Assume also that the log data are stored in an array of structures, and log[i]address, log[i].source, log[i].target, and log[i].time stamp, representing respectively, the requestor address 200, hyperlink source 201, hyperlink target 202, and time stamp 203, of log entry log[i]. In step 301, the session identification process begins by first sorting the entire log array based on the requestor address. If two log entries have the same requestor address, the ordering may be determined by their time stamps in ascending order. The objective of sorting based on requestor address is to group together all the requests coming from the same requestor. Log entries with different requestor addresses represent requests made by different users. In step 302, if there are log entries to be processed, control passes to step 303. In step 303, the next log entry from the sorted log array is obtained for processing. To process a log entry, we want to map the log entry into an active session. It is possible that a log entry cannot be appended to any of the currently active sessions. In this case, a new session with the current log entry (or access pair) will be opened. In step 304, if there is currently no such active session, then a new session corresponding to the current log entry is opened, in step 305. (Details about beginning a new session will be described with reference to FIG. 6.) Next, the process returns to step 302 as described above. In step 306, if there are currently active sessions, then it is determined whether the requestor address 200 of the current log entry is the same as that of any of the active sessions. Recall that the log entries have been sorted according to requestor address at the beginning in step 301. Thus, if the current log entry has a requestor address that is different from the current active sessions, it is assumed that the subsequent log entries will also have different addresses. If no match is found, all the currently active sessions are closed, in step 307 (details about closing all active sessions will be described with reference to FIG. 11). The process continues, in step 305, wherein a new session with the current log entry is begun.

In step 306, if the current log entry has the same requestor address as the active sessions, the process continues at step 308. In step 308, the time gap and the number of back steps of the current log entry against all active sessions is computed (described with reference to FIG. 7). The time gap represents the difference between the time stamp of the current log and that of the access pair in the tail of an active session. The number of back steps represents the number of backward access steps needed to traverse from the hyperlink target 202 of the last access pair of an active session to the hyperlink source 201 of the current log entry. For better performance, client systems usually cache some hypertext objects, so that no requests need to be made when the cached objects are referenced again. In this case, however, certain log entries representing part of a client's traversal path are missing, and a path representing the missing traversal steps (described with reference to FIGS. 9 and 12) should be added to the active session.

The time gap and number of back steps (prior access pairs) may be used as criteria to select a proper active session to append the current log entry, in step 309. A session pointer (sp) may be used to point to an active session meeting the criteria. In the process of finding an active session to append the current log entry to, dormant sessions are also identified. Dormant sessions are those to which no access pair has been added for a predetermined period of time. The set of access pairs in a dormant session represents a complete traversal path by a client. Dormant sessions are closed, in step 310. In step 311, if an active session can be found (sp is not empty) to map the current log entry to, then the access pair representing the current log entry is appended to it, in step 312. Otherwise, in step 305, a new session will be created for the current log entry. Processing returns to step 302, as described above. In step 313, after all log entries have been processed, all active sessions are closed, and the session identification process ends, in step 314.

In the above description of session identification, a time stamp is used to determine whether or not a session has become dormant. Alternatively, session dormancy can be determined by the number of accesses since the last time an access pair was appended to a session. In addition, we assumed that we are performing session identification against a log file or files. Those skilled in the art will appreciate that within the scope of the present invention, the session identification process can be performed dynamically as accesses occur. In this case, the sorting of log entries based on requestor address is not needed. Similarly, real-time dynamic processing may eliminate the need for the time stamp 203. For example, a system clock can be used to calculate a relative time gap. A possible downside to real-time processing is that at least some CPU costs will be incurred during peak hours whereas the hypertext logs can be batch processed at low-usage times.

FIG. 4 shows a session header 400 data structure having features of the present invention. The session header 400 (and the associated active session) may be stored in the main memory 14 of the server 5 or on a static memory such as DASD 15. As depicted, the session header 400 includes the pertinent data fields of an active session: requestor 401, dormant 402, timegap 403, backstep 404, previous 405, next 406, sessionhead 407, and sessiontail 408. The session header 400 points to a linked list of all the access pairs belonging to this active session (discussed with reference to FIG. 5). The requestor address 200 associated with an access pair is assigned to the requestor field 401 when a new session is opened. The dormant field 402 is a flag used to indicate whether or not this session is dormant and should be closed. The timegap field 403 represents the time difference of the time stamp of the current log entry and that of the last access pair on the current session. The backstep field 404 represents the number of backward access steps required to traverse backward from the hyperlink target of the last access pair to an access pair whose hyperlink target is the same as the hyperlink source of the current log entry. If the target of the last access pair of the active session is the same as the source of the current log entry, then the number of back steps is zero. In this case, the client can directly traverse from the last object of the session to the current target object, and the current log entry can be appended to the session without adding the missing steps. On the other hand, if no access pair in the session can be found whose target is the same as the source of the current log entry, then a predetermined large number L is assigned to backstep. Here, no hypertext object traversed in the current session could have referred the client to the target object in the current log entry. As a result, the current log entry cannot be appended to the session. Data fields previous 405 and next 406 are pointers to the previous and next active session headers, respectively. Finally, data fields sessionhead 407 and sessiontail 408 are pointers to the head and tail, respectively, of the list of access pairs of this session.

FIG. 5 shows an example of one hyperlink access pair 500 in a linked list data structure representing an active session pointed at by the session header 400. Each access pair 500 may include a time stamp 501, source 502, target 503, forward 504, and backward 505 data fields. The time stamp 501, source 502, target 503 data fields represent, respectively, the time stamp 203, hyperlink source 201, and the hyperlink target 202 of the corresponding log entry. Data fields forward 504 and backward 505 are links to the next access pair in the forward and backward direction.

Figure 6:
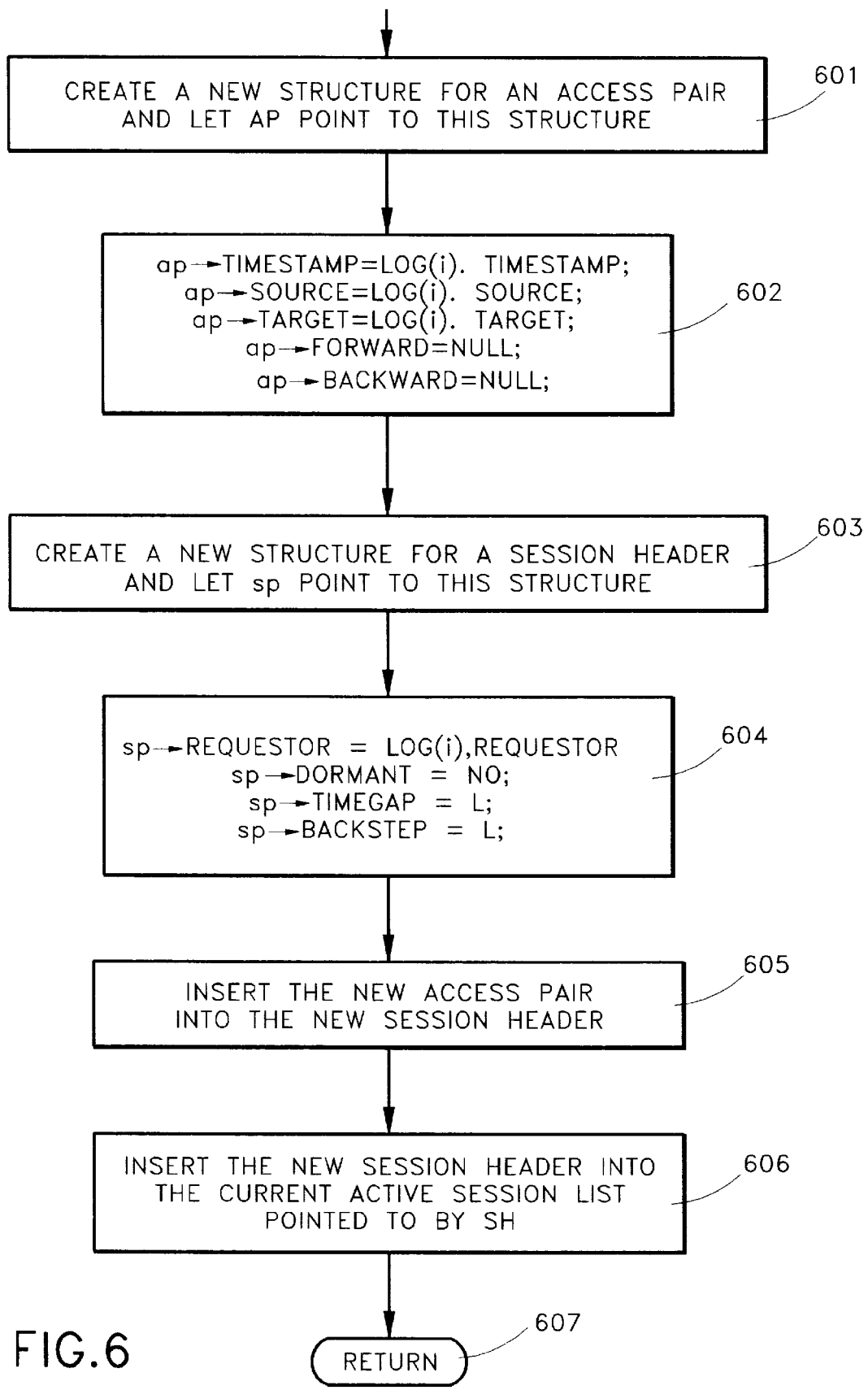
FIG. 6 is an example of logic for beginning a new active session (step 305)

FIG. 6 shows an example of a logic diagram for setting up a new active session (step 305). As depicted, in step 601, a new access pair 500 is created and an access pair pointer ap is initialized to point to the access pair 500. In step 602, the time stamp 501, source 502 and target 503 are assigned the respective values in the array representing current log entry, log[i].time stamp, log[i].source, and log[i].target. A new session header is also created, in step 603, and a session pointer sp is initialized to point to the new session header. In step 604, the session header data fields are assigned the values as shown. As depicted, the requestor 401 field is assigned the log[i].requestor value from the current log entry. The dormant 402 data field is initialized to indicate the session is active. The timegap 403 and backstep 404 data fields are initialized to predetermined default values L. In step 605, the access pair 500 is linked to the session head 407. In step 606, the new session header is linked to an active session list which is pointed at by a global session list pointer SH. After the session header is linked to the active session list, the process of setting up a new session is completed, in step 607.

Figure 7:
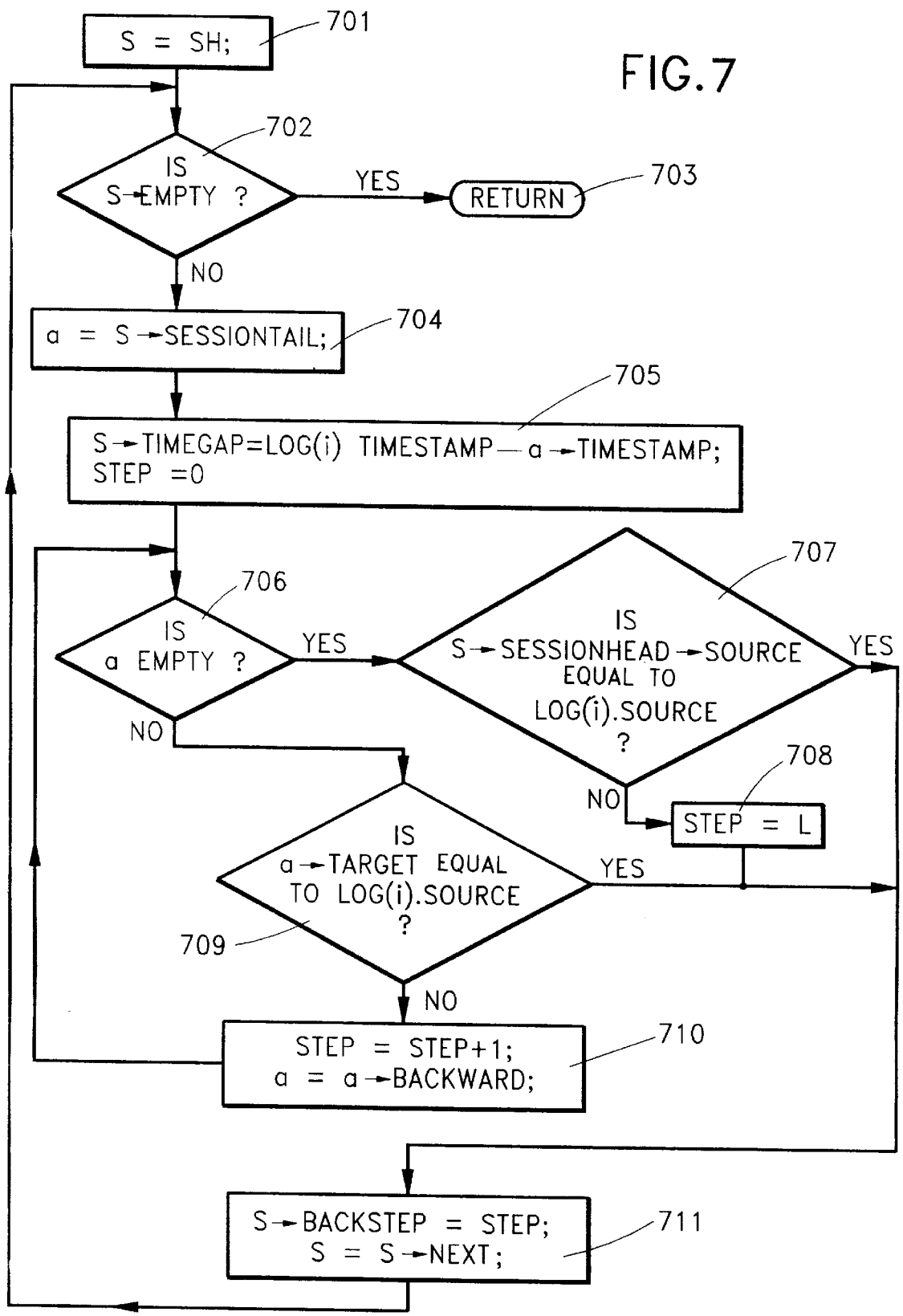
FIG. 7 is an example of a logic diagram for computing the time gap and the number of back steps for the current log entry (step 308) against all active sessions.

FIG. 7 shows an example of a method for determining the time gap and the number of back steps for all the current active sessions. Recall that due to the use of proxy servers 10 there may be many active sessions with the same requestor address and that (in step 301) the log entries have preferably been sorted by requestor address 200. Thus, the determination is done for all active sessions using the current log entry in order to determine which active session the current log should be appended or whether a new active session should be created. As depicted, in step 701, the process begins at the head of the active session list, and ends in step 703, when all active sessions are processed by the loop formed by steps 702 to 711. In step 704, to compute the time gap 403 for a session, link to the access pair at the tail end of the session. In step 705, compute the time gap 403 as the difference between the time stamp 203 of the current log entry and the time stamp 501 of the access pair 500 at the session tail 408. The number of back steps 404 may be determined as follows: In step 709, compare the value of the hyperlink target 503 of the access pair 500 at the tail 408 to the value of the hyperlink source 201 of the current log entry. In step 711, if equal, then set backstep 404 to a zero value, point to the next 406 session and repeat the process, at step 702. A zero value means that the log entry can be directly appended to the session without additional backward steps. In step 710, if they are not equal, then traverse backward 505 through the session 400 (repeating steps 706–709–710) to find an access pair whose target is the same as the source of the log entry. If none can be found in the current session, including the source of the first access pair in step 707, then the number of back steps is assigned a number L, in step 708. Note that we always check the target of an access pair in a session against the source of the current log entry. But, if the access pair is the first one in a session, we also check against its source. This is to handle the case of a traversal path can branching out from the first hyperlink source of a session to another hyperlink target.

Figure 8:
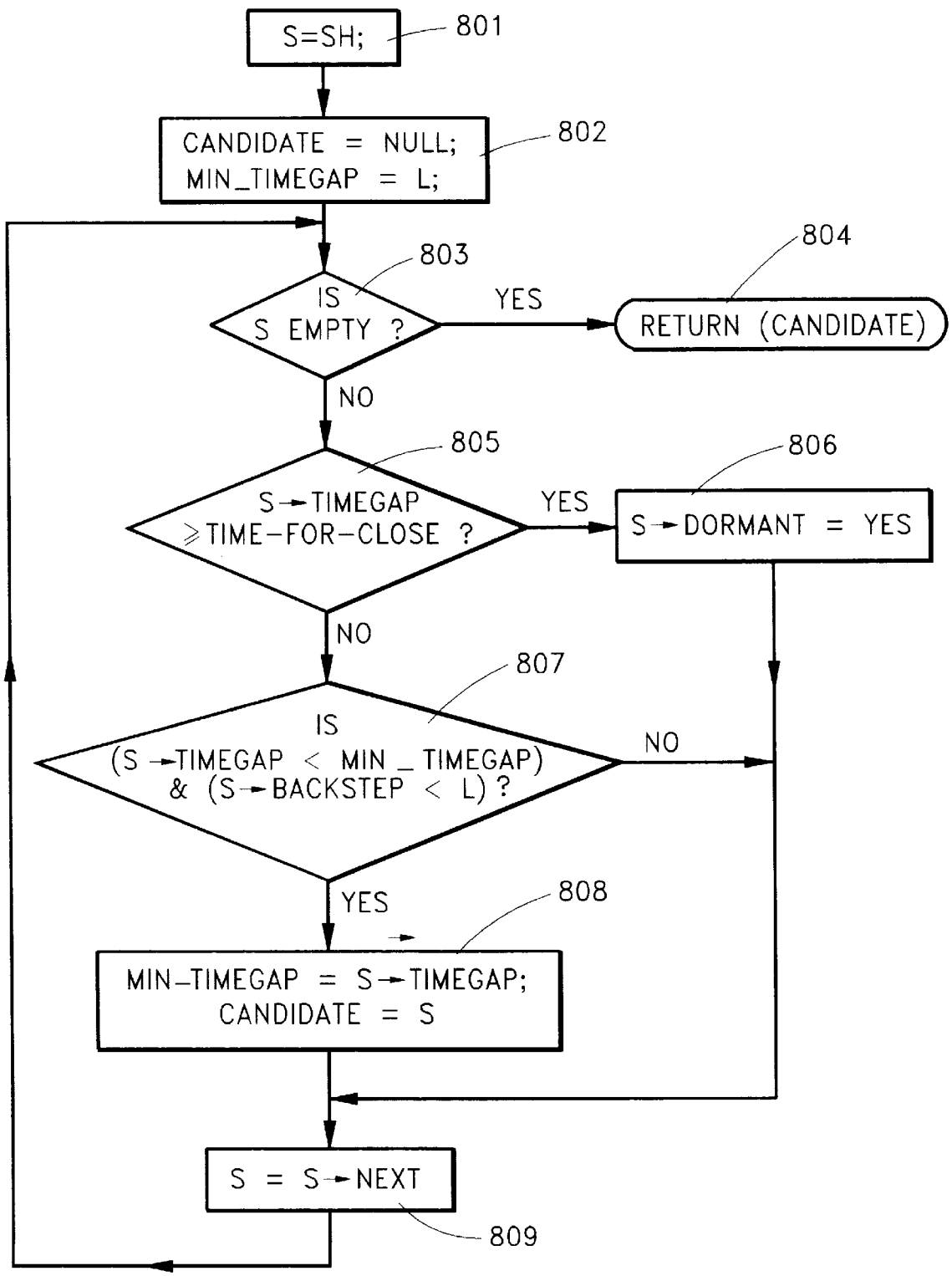
FIG. 8 is an example of a logic diagram for finding an active session to append the current log entry and mark all dormant sessions for closure (step 309)

FIG. 8 shows an example of a method for finding an active candidate session to append the current log entry and marking all the sessions which are considered dormant and should be closed (step 309). As depicted, in step 801, the first active session is selected from the head of the list of active sessions. The process ends, in step 804, when all active sessions have been processed. In step 805, If the time gap is greater than a pre-specified time, TIME_FOR_CLOSE, for closing a session, then the dormant 402 flag in the session header 400 is set to a true value, in step 806. In steps 807, 808 and 809, the active session having the smallest time gap whose number of back steps is less than the predetermined large number L, is preferably chosen as the candidate. Those skilled in the art will appreciate that there are other approaches within the spirit and scope of the present invention for identifying a candidate session. For example, using various combinations of thresholds with timegap 403 and backstep 404; or using backstep 404 value alone; or the backstep value 404 conditioned on the timegap 403 being less than some predetermined value.

Figure 9:
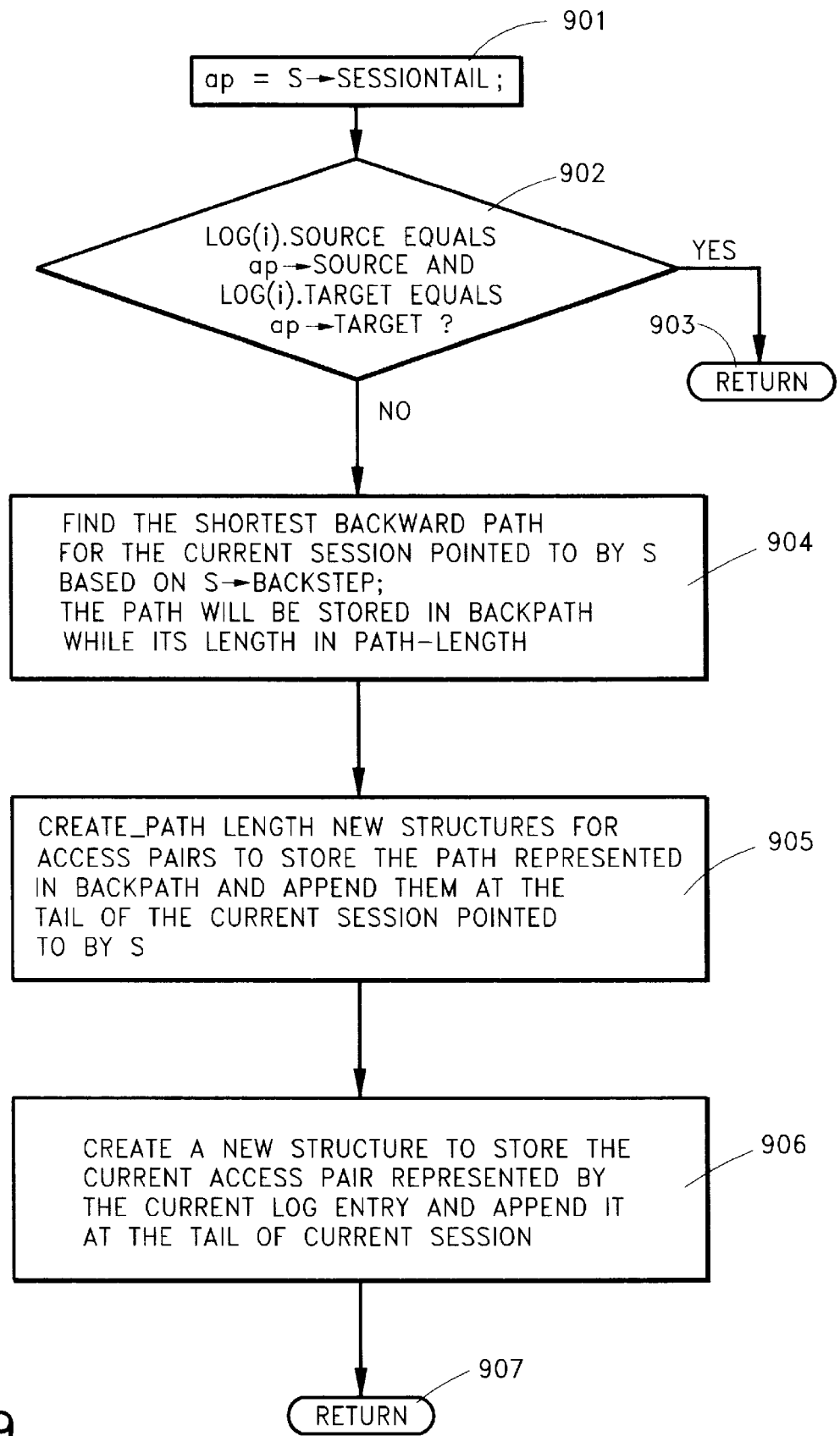
FIG. 9 is an example of a logic diagram for appending the current log entry to an active session (step 312)

FIG. 9 depicts an example of a method for appending the current log entry to the candidate session identified in step 309. In step 901, the current log entry is going to be appended at the tail end of the session 901 and the access pair pointer ap is set to the sessiontail 408. In step 902, if the access pair at the tail 408 is the same as the current entry log, then nothing has to be done and the process ends, in step 903. When the backstep 404 value for this session (described in FIG. 7) is not zero, it implies that there have been backward traversal steps by the client 3 that are not logged by the hypertext object server 5. These traversal steps may be missing because the client 3 or a proxy server 10 has cached those objects and no requests for those objects were made to the hypertext object server 5. So, before the current log entry can be appended to the session, some missing access pairs have to be added to the tail of the session. Since there may be many possible valid backward traversal paths from the last access pair to an access pair whose target is the same as the source of the current log entry and the server does not have record of them, it is sufficient to find one such path and append the corresponding access pairs to the session. One such path can be found by simply traversing the session backward from the tail until we find the pair whose target is the same as the source of the current log. However, there might be some steps that are repeatedly traversed along the backward path. These repeated traversal steps are not necessary to form a valid backward traversal path. On the other hand, a lengthy backward traversal path can consume a lot of memory space in constructing and maintaining the active session. Thus, in step 904, the shortest valid backward path is preferably determined (described with reference to FIG. 12). In step 905, additional access pairs, corresponding to the traversal path are created and appended to the tail of the current session. Finally, in step 906, the current log entry is appended to the session tail 408.

Figure 10:
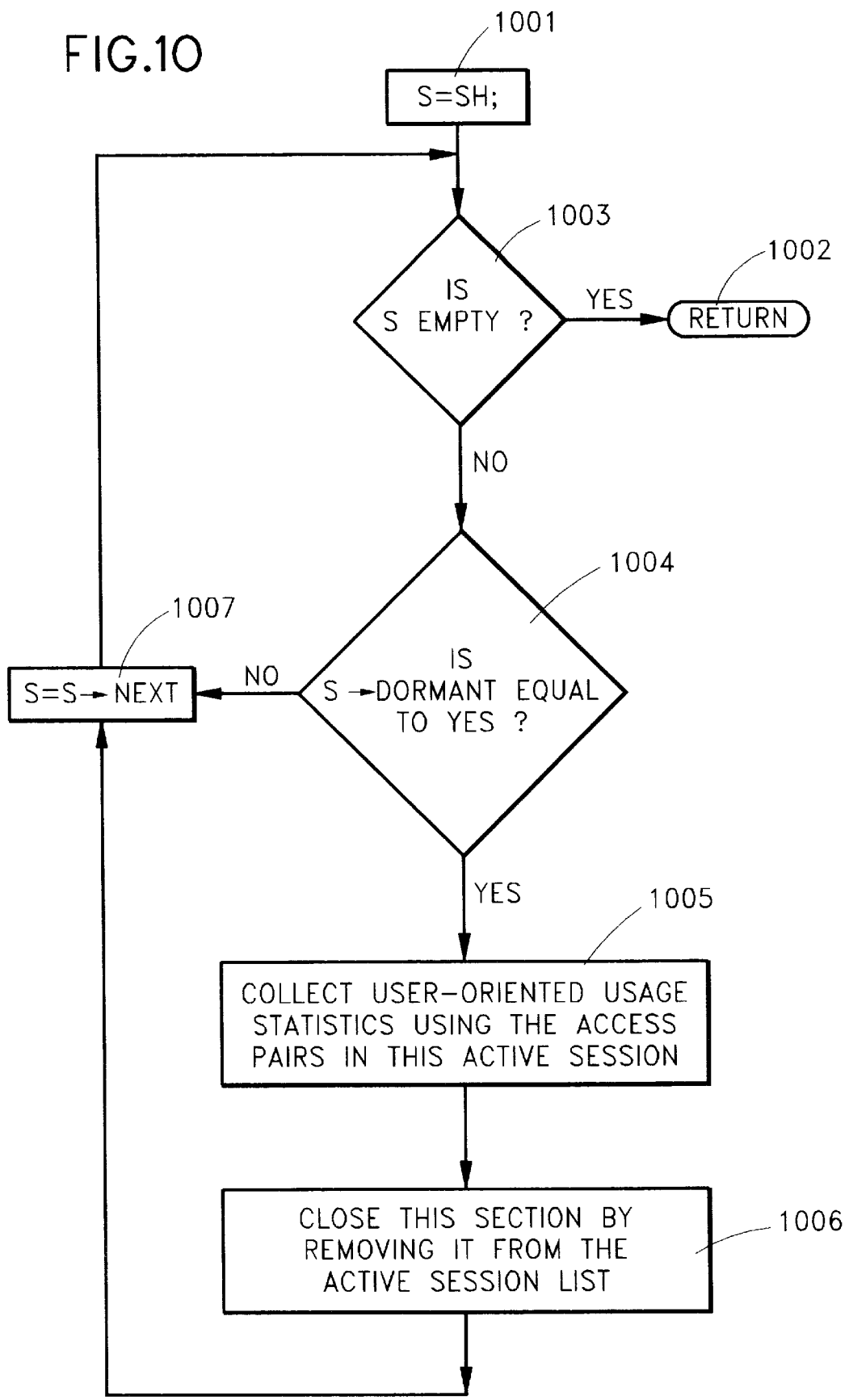
FIG. 10 is an example of a logic diagram for closing all dormant sessions in the current active session list (step 310); and collecting user-oriented object access statistics on the hypertext objects.

FIG. 10 is an example of a logic diagram for closing all dormant sessions in the current active session list (step 310); and collecting user-oriented object access statistics on the hypertext objects. The entire list of active sessions is examined. Assume S is a pointer to a session header 400 and SH is a pointer to the current active session list. By way of overview, the process starts by setting S to SH, in step 1001, and advances S to the next session on the list, in step 1007. In step 1003, if S is empty, the process ends in step 1003. In step 1003, if S is not empty, then a dormant flag 402 stored in the session header is checked, in step 1004. If the dormant flag is set to indicate the session is dormant, e.g., the flag=YES, then the access pairs linked in this session represent a pattern of hypertext objects that were accessed during a user session. A variety of user-oriented statistics can be collected, by conventional means, in step 1005. For example: the most frequently accessed pages; the most frequent source of visitors accessing the server, the average time spent, and the average number of pages visited; the distribution of user-session duration; the distribution of the number of pages visited in a session; the most frequent referrers to the site; and the pages from which most users exit the site. In step 1006, the entire session can then be removed from the active list after collecting necessary statistics. The process ends, in steps 1003 and 1002, after each active session has been examined,.

Figure 11:
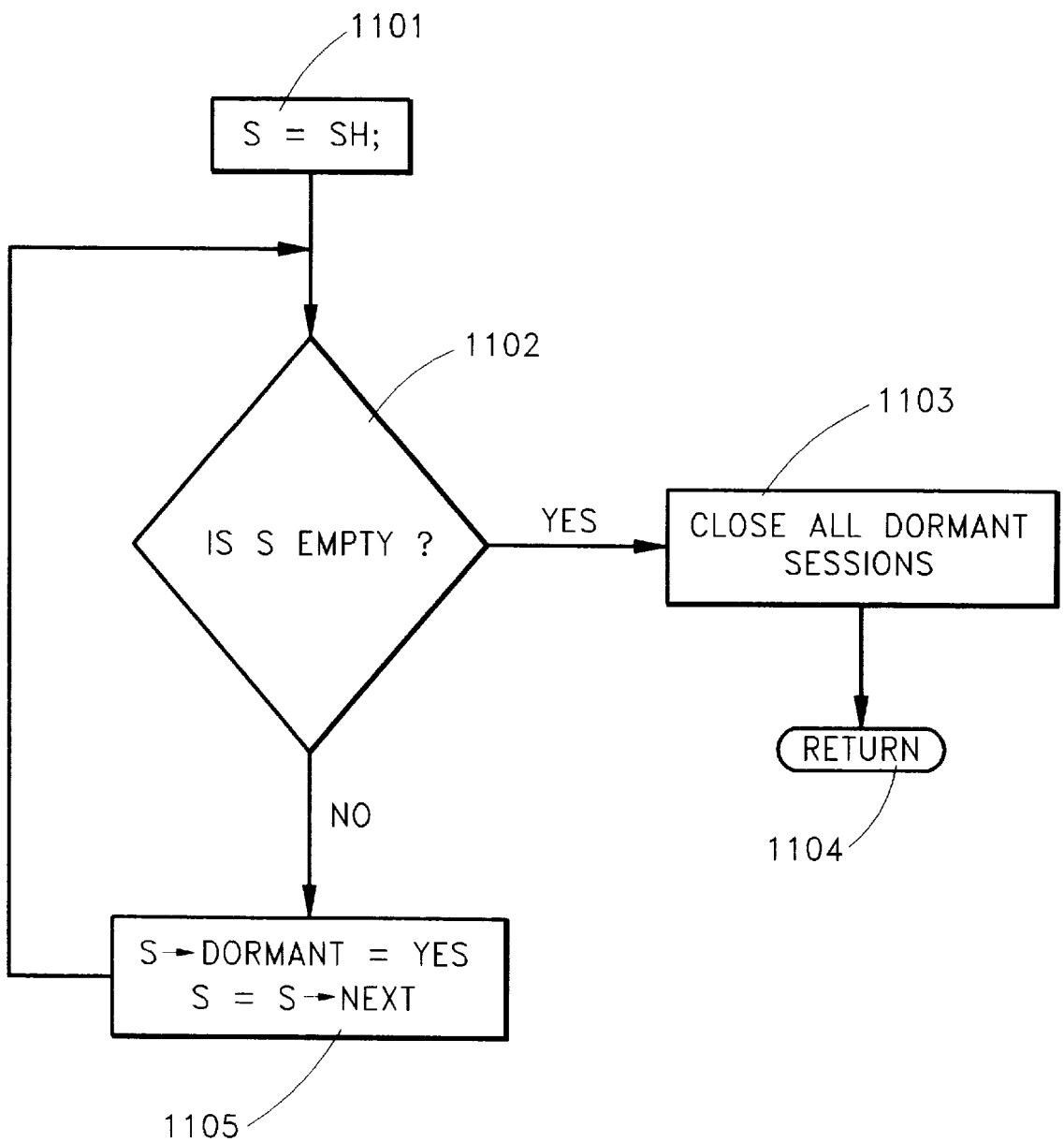
FIG. 11 is an example of a logic diagram for closing all currently active sessions (step 307)

FIG. 11 is an example of a logic diagram for closing all currently active sessions. This procedure is used after the entire log has been processed (step 313), or a new log entry with a different requester address is to be processed (step 307). As above, S is a pointer to a session header 400, and SH is a pointer to the start of the current active session list. In step 1101, set S to SH. In steps 1102 and 1105, for each session header 400, the dormant flag 402 of the session header pointing at S is set to YES (dormant). In step 1102, after all the session headers 400 are marked as dormant (i.e., S is empty), all the sessions marked as dormant may be closed, in step 1103, using the procedure described in FIG. 10.

Figure 12:
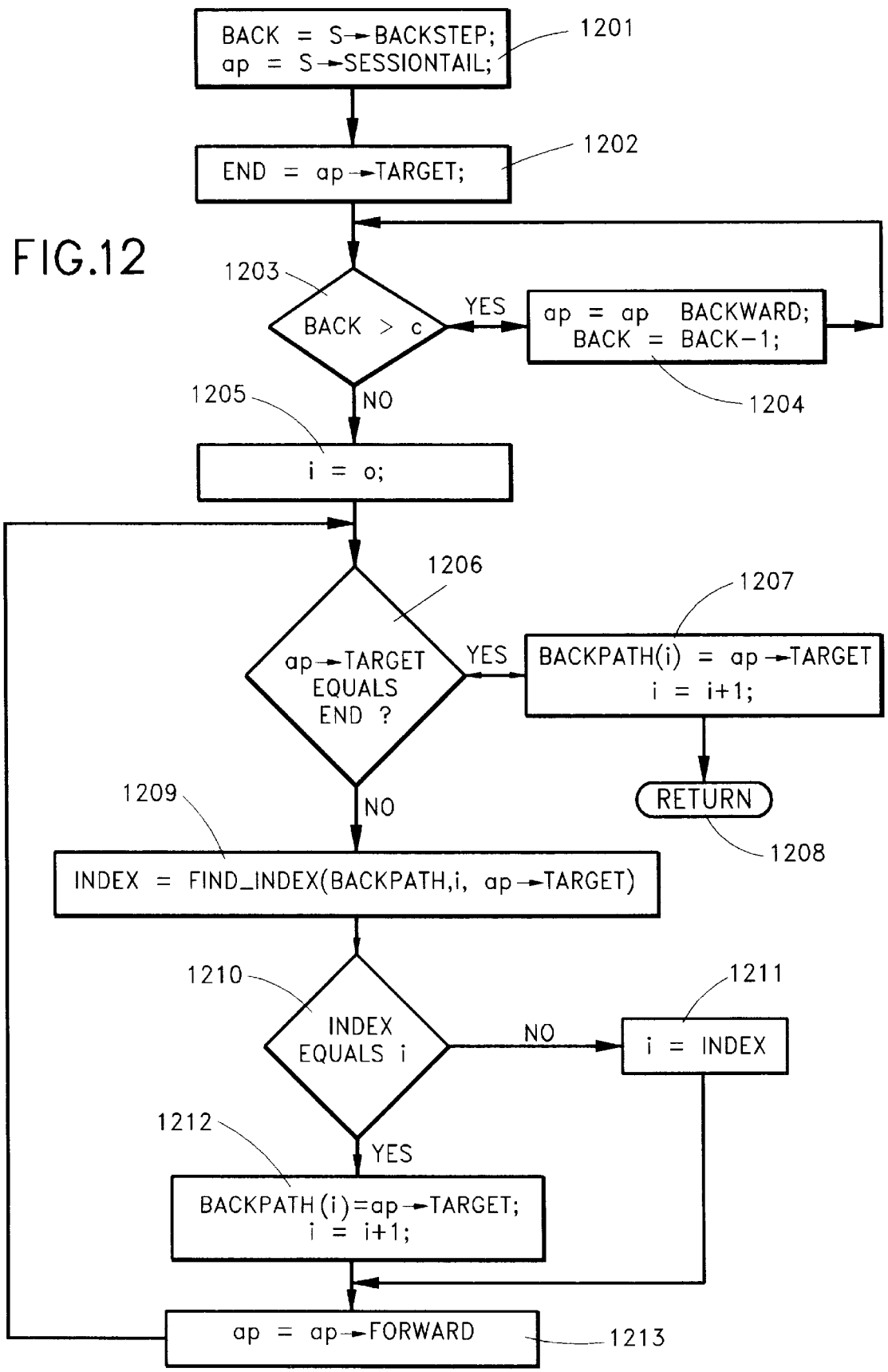
FIG. 12 is an example of a logic diagram for finding the shortest backward path for the current log entry (step 904) and an active session.

FIG. 12 is an example of a logic diagram for finding the shortest valid backward path (also called backpath) for the current log entry (step 904) in an active session. This is necessary because of traversal steps that may be missing due to client and/or proxy caching. There may be many possible valid backward traversal paths from the last access pair to an access pair whose target is the same as the source of the current log entry and as discussed, the (stateliness) server does not have any record of them. Thus, it is sufficient to find one such path and append the corresponding access pairs to the session. One such path can be found by simply traversing the session backward from the tail until we find the access pair whose target is the same as the source of the current log. However, there are very likely traversal steps that are repeated along the backward path. The repeated traversal steps are not required in order to form a valid backward traversal path, and may in fact consume a lot of memory space in constructing the session. Thus, FIG. 12 depicts a logic diagram for constructing the shortest valid backward path for the current log entry (step 904) in an active session.

Assume S points to the session header 400 for which the shortest valid backward path is to be found. As depicted, in step 1201, initialize a pointer "ap" to the access pair at the tail of the session 408, and a variable, "back" to equal the number of backsteps 404 recorded in the session header 400 pointed to by S. In step 1202, initialize a pointer "end" to the hyperlink target 503 of the access pair at the tail of the session 408. The number of back steps 404 recorded in the session header is first used to find the access pair whose target is the same as the source of the current log entry, in steps 1203 and 1204. It proceeds by traversing backward from the tail (ap=ap->backward) for a total of "back" access pairs, in step 1204. After this backward traversal of access pairs, "ap" points to the access pair whose target is the same as the source of the current log entry.

The shortest valid backward path is now found by going forward from the access pair pointed to by "ap". The process ends when the target of an access pair pointed to by "ap" is the same as "end", in step 1206 (set in step 1202). In step 1209, the shortest path may be stored in "backpath" in reverse order by using a function "find_index(backpath, I, ap->target)" (to be described in FIG. 13). Note that "backpath" is an array storing the hyperlink targets of the shortest path to be found by "find_index(backpath, i, ap->target)." More specifically, the function "find_index(backpath, I, ap->target" finds the "index" on "backpath" such that the next unique "ap->target" is to be appended to the path. For example, if "backpath[i]" is the same as "ap->target", then "i+1" is returned. If we cannot find an element in "backpath" matching "ap->target", then "i" is returned. If the returned "index" is the same as "i", in step 1210, this means that "ap->target" is a new hyperlink target which has not yet appeared on the path stored on "backpath". As a result, it is assigned to "backpath[i]" and "i" is incremented by one, in step 1212. But, if "index" is not the same as "i", it means that "ap->target" is already reflected in the path stored in "backpath[index-1]". In this case, "i" is set to "index", in step 1211 and control passes to step 1213. In step 1213, "ap" is advanced to "ap->forward", and the process repeats from 1206. Each element in "backpath" represents the hyperlink target 503 of an access pair 500 along the path. Until the end of the path (an access pair whose target is the same as the hyperlink source of the current log entry) is found 1207, "backpath" is expanded if the target pointed to by "ap" does not already exist in "backpath", in step 1212. If some element in "backpath" is found that is the same as the target pointed to by "ap", then "backpath" is contracted to eliminate the repeated element (details in FIG. 13). In addition to storing the path in "backpath", the length of this "backpath" may also be returned, in step 1208.

Figure 13:
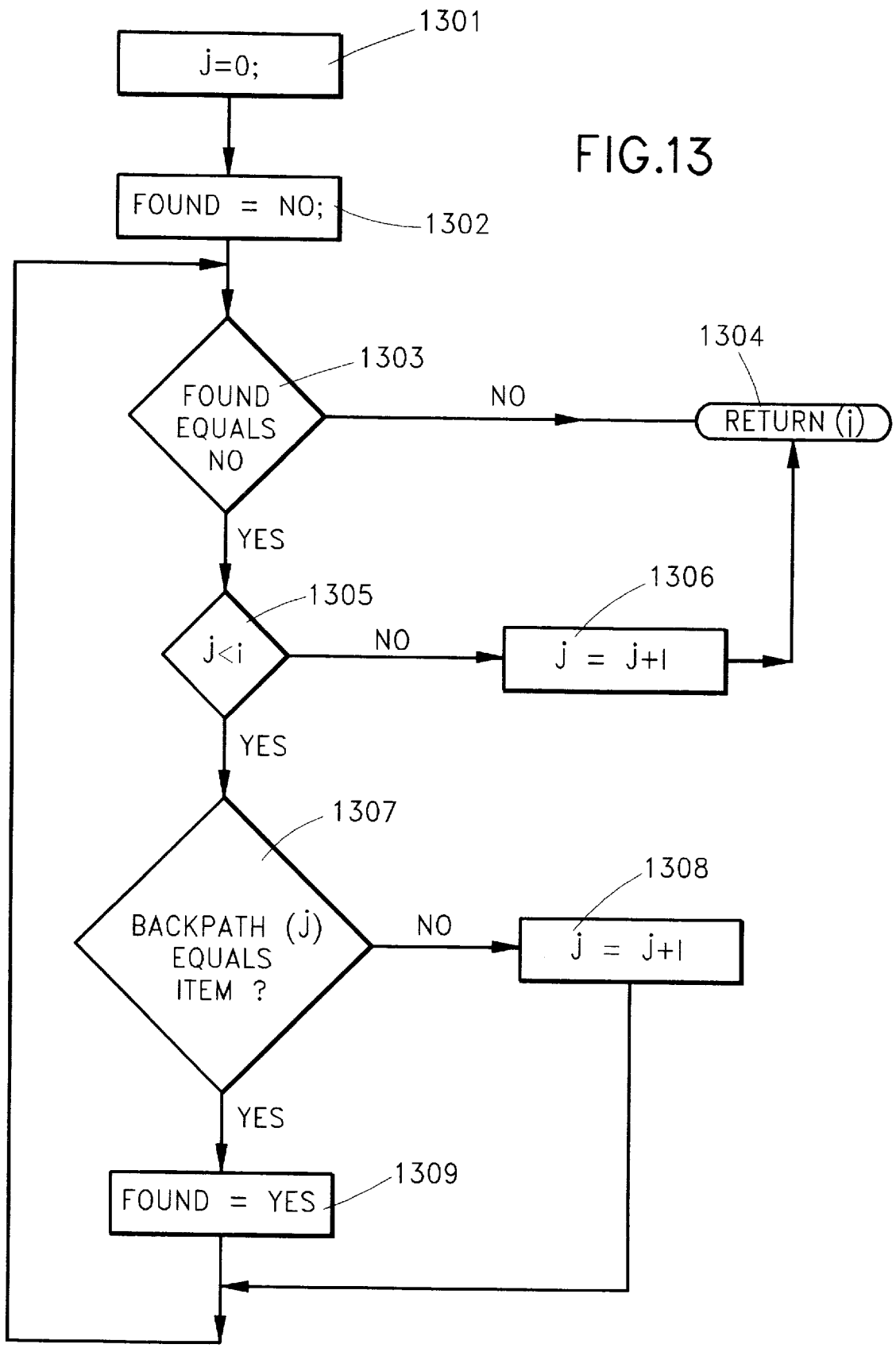
FIG. 13 is an example of a logic diagram for contracting the backwards access path in order to find the shortest backward path connecting two hypertext objects.

FIG. 13 is an example of a logic diagram for contracting the backwards access path (step 1209) in order to find the shortest backward path connecting two hypertext objects. By way of overview, the logic "find_index(backpath, i, item)", returns the index "i" in array "backpath" of an element having the same value as "item". In step 1301, assume a second pointer "j" to backpath is initialized to zero, and a flag "found" to indicate whether a match is found, is set to NO, in step 1302. Starting from the beginning of the array (j=0), each element in the array "backpath" is examined in the loop formed by steps 1303 through 1307, to see if it is the same as "item". In step 1307, if a match is found, control passes to step 1309. In step 1309, the "found" flag is set to YES and control passes to step 1303–1304. In this case, in step 1304, the returned index "j" points to the match for the input "item". In step 1305, if all the elements of the array "backpath" have been examined (j=i) and no match is found, control passes to step 1306. In step 1306, the index "j" is incremented and returned, in step 1304. In any case, the index returned in step 1304 points to the element in "backpath" where the next element is to be appended.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

We claim:

1. A computerized method for mapping client access patterns in a stateliness hypertext server, the method comprising the steps of:

collecting information for each client access, including a requestor address which is one of a proxy server address or a client address, a hyperlink source, and a hyperlink target;

mapping the hyperlink source, the hyperlink target and the requestor address into a hyperlink access group which represents a traversal path associated with a client;

storing the traversal path in a computer readable memory;

combining said hyperlink source and said hyperlink target into a hyperlink access pair which represents a traversal step for the requestor address from the hyperlink source to the hyperlink target, wherein for each access pair and each access group having a common requestor address, said mapping step further comprises the step of mating each current access pair with an access group for a session tail having a hyperlink target with a matching hyperlink source.

2. The method of claim 1, wherein said mapping step is done dynamically for said each access.

3. The method of claim 1, wherein said collecting step includes collecting agent information; and wherein said mapping step includes using said agent information collected.

4. The method of claim 1, wherein said collecting step includes collecting a time stamp associated with said each client access; and wherein said mapping step includes using the time stamp collected.

5. The method of claim 1, further comprising the steps of:
storing the information for each client access to an object as an entry in at least one log; and said collecting step further comprises the step of collecting the information stored in the log.

6. The method of claim 1, wherein if no current access pair matches with an access group, said mapping step further comprises the steps of:
a) traversing the access group backward from the session tail for an appended access pair having a hyperlink target matching the hyperlink source of the current access pair;
b) constructing and appending a valid backward traversal path including the hyperlink target matching the hyperlink source of the current access pair, in response to said traversing step; and
appending the hyperlink source of the current access pair to the access group having said session tail which matches the hyperlink source of the current access pair.

7. The method of claim 6, further comprising the step of contracting the valid backward traversal path by omitting access pairs that are repeatedly traversed on the valid backward traversal path.

8. The method of claim 1, further comprising the step of storing the information for each client access to an object as an entry in at least one log; said collecting step further comprising collecting the information stored in the log and sorting the information collected from the log according to the requestor address and a time stamp associated with the entry; and wherein for each access pair and each access group having a common requestor address, said mapping step further comprising the steps of:
searching each access group for a session tail having a hyperlink target which matches the hyperlink source of a current access pair; and if no access group has said session tail which matches the hyperlink source of the current access pair:
(a) traversing the access group backward from the session tail for an appended access pair having a hyperlink target matching the hyperlink source of the current access pair;
(b) constructing and appending a valid backward traversal path including the hyperlink target matching the hyperlink source of the current access pair, in response to said traversing step; and
appending the hyperlink source of the current access pair to the access group having said session tail which matches the hyperlink source of the current access pair.

9. The method of claim 1, further comprising the steps of:
determining a time elapsed since said mapping step had last occurred for the access group; and closing the access group if the time elapsed since said mapping step had last occurred exceeds a predetermined threshold.

10. The method of claim 1, further comprising the steps of counting a number of said mapping steps to other access groups since a most recent access pair has been mapped to the access group; and closing the access groups for which the number of said mapping steps exceeds a predetermined threshold.

11. The method of claim 6, further comprising the steps of:
identifying multiple candidate valid backward traversal paths associated with different access groups, in response to said searching step; and
said appending step including the step of selecting the candidate valid backward traversal path having a least number of associated access pairs.

12. The method of claim 11, further comprising the steps of:
determining a time elapsed since said mapping step had last occurred for the access group; and selecting the candidate valid backward traversal path associated with a smallest time elapsed or for which the time elapsed is less than a predetermined threshold.

13. The method of claim 1, further comprising the step of analyzing client access patterns based on the traversal paths, in response to said storing step.

14. A program storage device readable by a machine, tangibly embodying a program of instructions executable by the machine to perform method steps for mapping client access patterns in a stateless hypertext server, said method steps comprising:
collecting information for each client access, including a requestor address which is one of a proxy server address or a client address, a hyperlink source, and a hyperlink target;
mapping the hyperlink source, the hyperlink target and the requestor address into a hyperlink access group which represents a traversal path associated with a client;
storing the traversal path in a computer readable memory;
combining said hyperlink source and said hyperlink target into a hyperlink access pair which represents a traversal step for the requestor address from the hyperlink source to the hyperlink target, wherein for each access pair and each access group having a common requestor address, said mapping step further comprises the step of mating each current access pair with an access group for a session tail having a hyperlink target with a matching hyperlink source.

15. The program storage device of claim 14, wherein said mapping step is done dynamically for said each access.

16. The program storage device of claim 14, wherein said collecting step includes collecting agent information; and wherein said mapping step includes using said agent information collected.

17. The program storage device of claim 14, wherein said collecting step includes collecting a time stamp associated with said each client access; and wherein said mapping step includes using the time stamp collected.

18. The program storage device of claim 14, further comprising the steps of:
storing the information for each client access to an object as an entry in at least one log; and said collecting step further comprises the step of collecting the information stored in the log.

19. The program storage device of claim 14, wherein if no current access pair matches an access group, said mapping step further comprises the steps of:
a) traversing the access group backward from the session tail for an appended access pair having a hyperlink target matching the hyperlink source of the current access pair;

b) constructing and appending a valid backward traversal path including the hyperlink target matching the hyperlink source of the current access pair, in response to said traversing step; and appending the hyperlink source of the current access pair to the access group having said session tail which matches the hyperlink source of the current access pair.

20. The program storage device of claim 19, further comprising the step of contracting the valid backward traversal path by omitting access pairs that are repeatedly traversed on the valid backward traversal path.

21. The program storage device of claim 14, further comprising the step of storing the information for each client access to an object as an entry in at least one log; said collecting step further comprising collecting the information stored in the log and sorting the information collected from the log according to the requestor address and a time stamp associated with the entry; and wherein for each access pair and each access group having a common requestor address, said mapping step further comprising the steps of:

searching each access group for a session tail having a hyperlink target which matches the hyperlink source of a current access pair; and if no access group has said session tail which matches the hyperlink source of the current access pair:

(a) traversing the access group backward from the session tail for an appended access pair having a hyperlink target matching the hyperlink source of the current access pair;

(b) constructing and appending a valid backward traversal path including the hyperlink target matching the hyperlink source of the current access pair, in response to said traversing step; and appending the hyperlink source of the current access pair to the access group having said session tail which matches the hyperlink source of the current access pair.

22. The program storage device of claim 14, further comprising the steps of:

determining a time elapsed since said mapping step had last occurred for the access group; and closing the access group if the time elapsed since said mapping step had last occurred exceeds a predetermined threshold.

23. The program storage device of claim 14, further comprising the steps of counting a number of said mapping steps to other access groups since a most recent access pair has been mapped to the access group; and closing all access groups for which the number of said mapping steps exceeds a predetermined threshold.

24. The program storage device of claim 19, further comprising the steps of:

identifying multiple candidate valid backward traversal paths associated with different access groups, in response to said searching step; and said appending step including the step of selecting the candidate valid backward traversal path having a least number of associated access pairs.

25. The program storage device of claim 24, further comprising the steps of:

determining a time elapsed since said mapping step had last occurred for the access group; and selecting the candidate valid backward traversal path associated with a smallest time elapsed or for which the time elapsed is less than a predetermined threshold.

26. The program storage device of claim 14, further comprising the step of analyzing client access patterns based on the traversal paths, in response to said storing step.

27. A stateless hypertext server apparatus for mapping client access patterns via a computer network, comprising:

object usage analysis logic for collecting information for each client access, including a requestor address which is one of a proxy server address or a client address, a hyperlink source, and a hyperlink target;

the object usage analysis logic is further adapted for mapping the hyperlink source, the hyperlink target and the requestor address into a hyperlink access group data structure which represents a traversal path associated with a client; and a computer readable memory, coupled to the object usage analysis logic, for storing the traversal path.

28. The stateless hypertext server apparatus of claim 27, wherein the data structure comprises a linked list and the object usage analysis logic is adapted for: combining said hyperlink source and said hyperlink target into a hyperlink access pair which represents a traversal step for the requestor address from the hyperlink source to the hyperlink target; and linking the hyperlink access pair to the data structure.

29. The stateless hypertext server apparatus of claim 27, wherein the object usage analysis logic is adapted for dynamically mapping the hyperlink source, the hyperlink target and the requestor address into the hyperlink access group data structure for said each access.

30. The stateless hypertext server apparatus of claim 27, wherein the object usage analysis logic is adapted for collecting agent information and mapping the hyperlink source, the hyperlink target and the requestor address into the hyperlink access group data structure according to said agent information collected.

31. The stateless hypertext server apparatus of claim 27, wherein the object usage analysis logic is adapted for collecting a time stamp associated with said each client access and mapping the hyperlink source, the hyperlink target and the requestor address into the hyperlink access group data structure according to the time stamp collected.

32. The stateless hypertext server apparatus of claim 27, further comprising:

at least one hypertext request log, coupled to the network, for storing the information for each client access to an object as an entry in the log; and wherein the object usage analysis logic is coupled to the log for collecting the information.

33. The stateless hypertext server apparatus of claim 27, wherein for each access pair and each access group data structure having a common requestor address, further comprising:

the object usage analysis logic adapted for searching each access group data structure for a session tail having a hyperlink target which matches the hyperlink source of a current access pair; and backward path logic, coupled to the object usage analysis logic, for traversing the access group data structure backward from the session tail for an appended access pair having a hyperlink target matching the hyperlink source of the current access pair, if no access group data structure has said session tail which matches the hyperlink source of the current access pair;

backward path construction logic, coupled to the backward path logic, for constructing and appending a valid backward traversal path including the hyperlink target matching the hyperlink source of the current access pair, in response to said traversing step; and access path appending logic, coupled to the backward path construction logic, for appending the hyperlink source of the current access pair to the access group data structure having said session tail which matches the hyperlink source of the current access pair.

34. The stateless hypertext server apparatus of claim 33, wherein the backward path construction logic is further adapted for contracting the valid backward traversal path by omitting access pairs that are repeatedly traversed on the valid backward traversal path.

35. The stateless hypertext server apparatus of claim 33, further comprising:
   at least one hypertext request log, coupled to the network, for storing the information for each client access to an object as an entry in the log; and wherein the object usage analysis logic is coupled to the log for collecting the information; and
   the object usage analysis logic is further adapted for sorting the information collected from the log according to the requestor address and a time stamp associated with the entry; and wherein the information for each access pair is collected from the log.

36. The stateless hypertext server apparatus of claim 27, wherein the object usage analysis logic is further adapted for determining a time elapsed since said mapping step had last occurred for the access group data structure; and closing the access group data structure if the time elapsed since said mapping step had last occurred exceeds a predetermined threshold.

37. The stateless hypertext server apparatus of claim 27, wherein the object usage analysis logic is further adapted for counting a number of access pairs mapped to other access group data structures since a most recent access pair has been mapped to the access group data structure; and closing all access group data structures for which the number exceeds a predetermined threshold.

38. The stateless hypertext server apparatus of claim 33, wherein the object usage analysis logic is further adapted for identifying multiple candidate valid backward traversal paths associated with different access group data structures; and selecting and appending the candidate valid backward traversal path having a least number of associated access pairs.

39. The stateless hypertext server apparatus of claim 38, wherein the object usage analysis logic is further adapted for determining a time elapsed since a most recent access pair has been mapped to the access group data structure; and selecting the candidate valid backward traversal path associated with a smallest time elapsed or for which the time elapsed is less than a predetermined threshold.

40. The stateless hypertext server apparatus of claim 27, wherein the object usage analysis logic is further adapted for analyzing client access patterns based on the traversal paths, in response to said storing step.

41. The stateless hypertext server apparatus of claim 27, wherein the server is communicating over a network via the hypertext transfer protocol.

* * * * *